United States Patent [19]
Marzocchi

[11] 3,864,203
[45] Feb. 4, 1975

[54] FIBER REINFORCED ELASTOMERS
[75] Inventor: Alfred Marzocchi, Cumberland, R.I.
[73] Assignee: Owens-Corning Fiberglas Corporation, Toledo, Ohio
[22] Filed: Nov. 20, 1970
[21] Appl. No.: 91,472

[52] U.S. Cl. ............ 161/175, 117/70 C, 117/70 A, 117/75, 117/115, 117/64 R, 117/66, 117/67, 117/126 GB, 117/126 GS, 117/128.4, 117/128.7
[51] Int. Cl. ........ B44d 1/16, B44d 1/06, E06b 9/26
[58] Field of Search ...... 117/70 A, 70 C, 70 S, 218, 117/126 GB, 128, 129, 128.4, 75, 115, 126 GS, 64 R, 66, 67; 161/175; 156/124, 110 C, 137; 152/393, 359

[56] References Cited
UNITED STATES PATENTS

| | | |
|---|---|---|
| 1,747,940 | 2/1930 | Kienle ............................ 117/128 |
| 2,567,162 | 9/1951 | Sanders ........................... 117/218 |
| 3,053,686 | 9/1962 | Krämer ........................... 117/128 |
| 3,222,219 | 12/1965 | Saunders et al. ................. 117/218 |
| 3,264,122 | 8/1966 | Earl ................................. 117/129 |
| 3,413,186 | 11/1968 | Marzocchi ................... 117/126 GB |
| 3,424,608 | 1/1969 | Marzocchi et al. ............ 117/126 GB |
| 3,451,847 | 6/1969 | Ashpole et al. ................... 117/129 |

*Primary Examiner*—Cameron K. Weiffenbach
*Attorney, Agent, or Firm*—Carl G. Staelin; John W. Overman; Keith V. Rockey

[57] ABSTRACT

This invention is addressed to glass coated metal fibers and a method for treating same wherein the glass coated fibers are either coated with a glass fiber anchoring agent or impregnated with an elastomer compatible polymeric material for use as reinforcement in elastomeric products.

35 Claims, 8 Drawing Figures

PATENTED FEB 4 1975 3,864,203
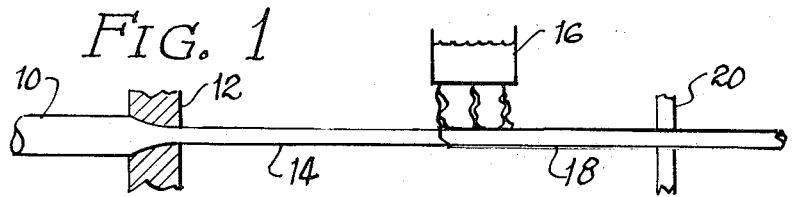
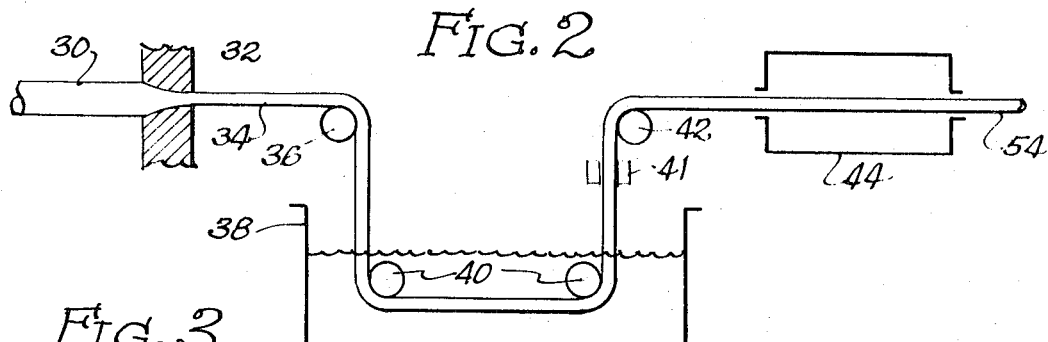
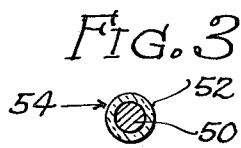
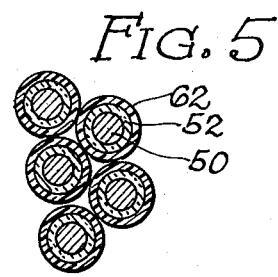
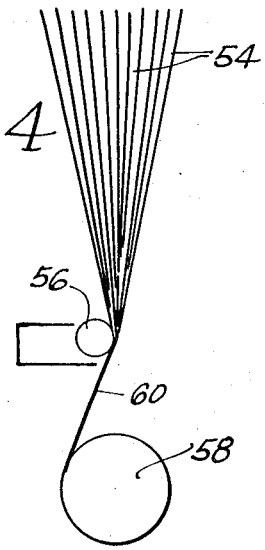
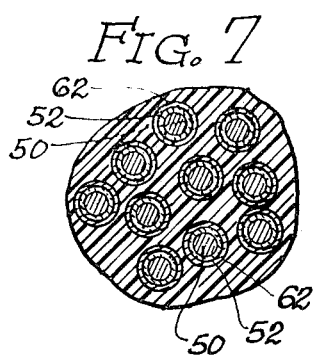
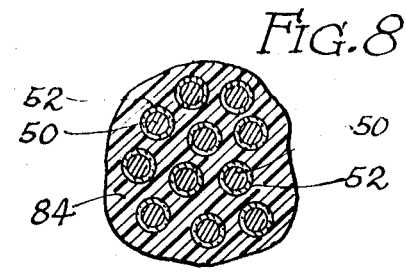
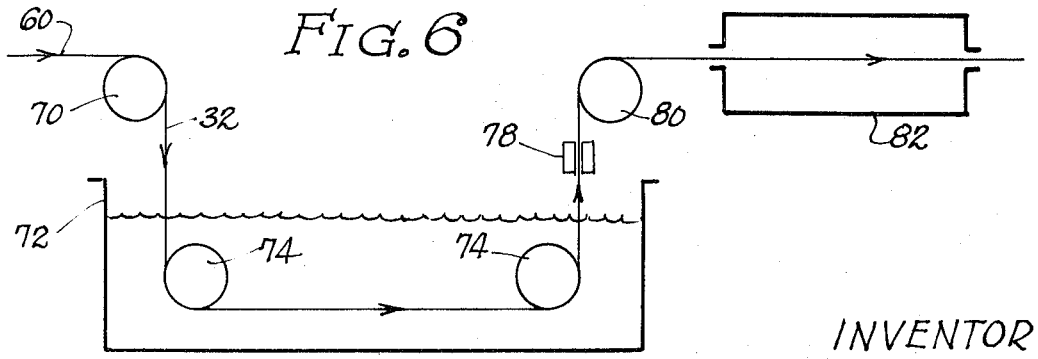
INVENTOR
Alfred Marzocchi
by Staelin & Overman
Attys 3,864,203

FIBER REINFORCED ELASTOMERS

This invention relates to reinforced elastomeric materials, and more particularly to the treatment of metal fibers or wires to make fuller utilization of the desirable characteristics of such fibers or wires in their combination with elastomeric materials in the manufacture of fiber-reinforced elastomeric products.

As used herein, the term "elastomer" is intended to mean and include natural rubber in the cured or uncured stage, vulcanized or unvulcanized stage, and synthetic organic elastomeric materials such as styrene, nitriles, acrylic and esters and terpolymers thereof with styrene and acrylonitriles; styrene and vinyl pyridine; and EPDM rubbers as represented by butadiene polymers and copolymers with monoolefins such as butadiene-styrene copolymers, butadiene-acrylonitrile copolymers, butadiene-styrenevinyl pyridine terpolymers, chloroprene, isoprene, neoprene, isobutyl rubber and the like elastomeric polymers and copolymers in their cured and uncured stages, and vulcanized or unvulcanized stages. Included also are the EPDM rubbers, such as formed by the interpolymerization of ethylene analpha monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubbers.

The invention is addressed to the fuller utilization of the desirable characteristics of metal fibers or wires, such as high strength, when used in combinations with elastomeric materials as a reinforcement or as a stabilizing agent in belt manufacture, as reinforcing cords and fabrics to increase the strength, life, wearability and service characteristics in rubber tires, or belts as a reinforcement or the like in other elastomeric coated fabrics and molded elastomeric products.

It has been the practice in the manufacture of metal fiber or wire reinforced tires and the like to employ a metal fibers or wire reinforce tires and the like to employ a metal yarn prepared by twisting together three brass plated steel wires, each having a diameter of about 0.0059 inch, and then plying together three of the twisted wire strands to form a multi-wire yarn. A plurality of such yarns are then laid down among various layers of an elastomer, such as rubber, and the resulting assembly is molded and cured to form a metal wire reinforced elastomeric product.

The practice as hereinabove described has not been altogether satisfactory for a variety of reasons, and most significant being that it has not been possible to fully integrate the twisted and plied fibers with elastomeric systems whereby reinforcement with metal fibers does not give the desired increase in strength. It is believed that the inability to fully integrate metal fibers or wires with elastomeric systems stems at least in part from the fact that the surfaces of the metal fibers or wires are smooth, rod-like members to which it is difficult to physically interbond the elastomeric material.

In addition to the foregoing, the practice as heretofore described has required the use of brass-plated wires in order to minimize oxidation of the individual wires.

It is accordingly an object of the present invention to provide a new and improved metal fiber or wire system which enables fuller utilization to be made of the desirable characteristics of metal fibers or wires and the like when used in combination with elastomeric materials in the manufacture of fiber-reinforced molded elastomeric products and coated fabrics.

It is a more specific object of the invention to provide a new and improved method for the treatment of metal wires and the like to improve the bonding relationship of metal fibers or wires with elastomeric materials, and the fiber systems resulting therefrom.

These and other objects and advantages of the invention will appear hereinafter, and, for purposes of illustration, but not of limitation, an embodiment of the invention is shown in the accompanying drawings, in which:

FIG. 1 is a schematic flow diagram illustrating the treatment of individual metal fibers or wires in accordance with one embodiment of the invention;

FIG. 2 is a schematic flow diagram illustrating the treatment of metal fibers or wires in accordance with another embodiment of the invention;

FIG. 3 is a sectional view of metal fibers treated in accordance with the diagrams illustrated in FIGS. 1 and 2;

FIG. 4 is a flow diagram showing the further treatment of glass coated metal fibers to improve the processing characteristics of the fibers when used in combination with elastomeric materials in the manufacture of fiber-reinforced elastomeric materials;

FIG. 5 is a cross-sectional view of the fibers processed in accordance with the diagram of FIG. 4;

FIG. 6 is a flow diagram illustrating the treatment of fibers treated in accordance with the diagram of FIG. 1 or 2 subsequent to their being formed into bundles in accordance with the preferred practice of the invention;

FIG. 7 is a cross-sectional view of fibers treated in accordance with the diagram illustrated in FIG. 6 in which the individual fibers have been first treated to form a thin coating thereon; and FIG. 8 is a cross-sectional view of fibers treated in accordance with the diagram illustrated in FIG. 6.

The concepts of the present invention reside in metal wires or fibers having a thin continuous coating of glass on the surfaces thereof. The glass coated metal fibers or wires can be treated in accordance with techniques used with glass fiber systems to more fully integrate the glass coated metal fibers with elastomeric materials in the manufacture of fiber reinforced elastomeric products.

Thus, the glass coated metal fibers can be treated with a treating composition which has preferably been formulated to include a glass fiber anchoring agent, such as organo silicon compound, to form a thin coating on the glass coated metal fiber to improve the processing characteristics of the fibers by imparting to the glass coating the desired lubricity to prevent destruction of the glass coating through mutual abrasion during subsequent processing into strands, cords, yarns, fabrics or the like, hereinafter referred to as bundles, and to improve the performance characteristics of the fibers when used in combination with elastomeric materials in the manufacture of fiber reinforced elastomeric products. Fibers which have been treated with a composition containing an organo silicon compound can be combined directly with elastomeric materials, or they can be further processed by forming into bundles and impregnated with an elastomer compatible material whereby the impregnant penetrates the bundle to individually coat the fibers and to intertie the fiber system to elastomeric materials with which the fibers are combined in the manufacture of fiber reinforced elastomeric products.

Alternatively, glass coated fibers, which may or may not have been previously treated with a composition containing an organo silicon compound, can be formed into bundles and impregnated as described above whereby the impregnant serves to intertie the fiber system with elastomeric materials.

Metal wires or fibers which can be processed in accordance with the concepts of the present invention include those formed of steel, aluminum, copper or the like, or metal coated metal wires such as steel wires coated with copper, zinc, brass or the like. Use is preferably made of wires formed of a low carbon steel.

The metal wires used in the invention can have any diameter such that the wires maintain their fibrous characteristics. For best results, use should be made of wires having diameters within the range of 0.00015 to 0.00075 inch, and preferably 0.00030 to 0.00040 inch.

Wires having diameters suitable for use in the present invention can be prepared by a variety of known methods, including hot or cold drawing or molten drawing. The glass coating is preferably applied to the metal wires as soon as possible after they are formed in order to prevent or substantially minimize corrosion and/or oxidation of the wire on exposure to ambient conditions.

The following examples will serve to illustrate the principal concepts of the invention.

EXAMPLE 1

Preparation of Glass Coated Steel Wire

A wire having a diameter of about 0.00035 inch is coated with glass in the following manner. Referring specifically to FIG. 1 of the drawing, a steel rod 10 is hot drawn through a die 12 while at a temperature of about 1200°F. to form a wire 14 having a diameter of 0.0035 inches.

The wire 14 drawn out of die 12 is at a temperature of about 1500°F, and, while still at this temperature is contacted with droplets of molten glass from a furnace 16 which adhere to the hot surface of wire 14 to form an irregular coated wire 18, which is drawn thin by passing the coated wire 18 through a second die 20 to smooth out and form the glass coating into a substantially uniform continuous coating.

The molten glass fed to the wire is adjusted to a rate sufficient to provide a final glass coating having a thickness of about 0.00010.

It will be understood that the thickness of the glass coating can be varied within wide ranges, depending somewhat upon the intended use of the coated wire. It is generally preferred that the glass coating be sufficiently thin that the coated wire retains its fibrous characteristics. For this purpose, best results are usually obtained when the thickness of the glass coating falls within the range of 0.00001 to 0.00020 inch.

It will be understood that it is also possible and sometimes desirable to add the molten glass to the wire at the drawing die whereby the glass serves as the coating system and as a wire lubricant.

Instead of molten glass, use can also be made of glass frit as the source of the glass coating on the individual wires, which is reduced to a molten state upon contact with the hot wire. Whether molten glass or glass frit is employed, it is generally desirble that the wire be at a temperature within the range of 1200°–1900°F. when contacted with the glass material.

It will be understood that various other methods can be used to form the glass coating on the metal wires in accordance with the invention. For example, the wire can be passed through a bath of molten glass as illustrated by the following example.

EXAMPLE 2

Preparation of Glass Coated Steel Wire

Referring specifically to FIG. 2 of the drawing, a steel rod 30 formed of the low carbon steel utilized in Example 1 is drawn through a die 32 to produce a thin steel wire 34 having a diameter of about 0.00035 inch. Thereafter, the wire 34 is passed over a roller 36 for passage downwardly into a bath 38 containing molten glass.

The wire 34 is then passed under a pair of rollers 40 and upwardly through a wiping die 41, which serves to smooth the glass deposited on wire 34 during passage through the bath to a substantially uniform, continuous coating, and over a roller 42 for passages through a quenching station 44 in which the coated glass wire is cooled by means of, for example, a stream of hot air.

The resulting wire is found to contain a glass coating having a thickness of about 0.00015 inch.

The glass coated wire produced in accordance with the schematic illustrations of FIGS. 1 and 2 is shown in cross section in FIG. 3. As shown the glass forms a thin, continuous coating 52 on the wire fiber 50.

After the metal wires or fibers have been treated to form the thin glass coating on the surfaces thereof, the glass coated metal fibers are preferably treated with a composition formulated to contain an organo silicon compound to form a thin coating on the glass coating to impart thereto the desired lubricity to prevent destruction of the glass coated metal fibers by mutual abrasion during subsequent processing and to facilitate more fully integration of the fibers with elastomeric systems. The concept of applying organo silicon compounds to the glass coated metal fibers is illustrated by the following examples wherein use is made of a composition containing a film forming diluent component in combination with an organo silicon compound.

EXAMPLE 3

8.0% by weight partially dextrinized starch
1.8% by weight hydrogenated vegetable oil
0.4% by weight cationic wetting agent(lauryl amine acetate)
0.2% by weight nonionic emulsifying agent
1.0% by weight gamma-aminopropyltriethoxy silane
88.6% by weight water

EXAMPLE 4

3.2% by weight saturated polyester resin
0.1% by weight fatty acid amine wetting agent(Nopcogen 16 L)
0.1% by weight polyvinyl alcohol
3.0% by weight pyrrolidine
0.3% by weight N-(beta-aminoethyl)-gamma-aminopropyl triethoxy silane
0.1% by weight glacial acetic acid
93.2% by weight water

EXAMPLE 5

0.2% by weight paraffin wax in aqueous emulsion
1.3% by weight cationic amide polyester resin
2.3% by weight polyglycol condensate(300 to 400 m w)
0.25% by weight gelatin
0.5% by weight gamma-glycidoxypropyltrimethoxy silane
0.1% by weight dibasic ammonium phosphate
0.2% by weight glacial acid
95.15% by weight water

EXAMPLE 6

0.5% by weight gamma-aminopropyltriethoxy silane
0.25% by weight fatty acid amine wetting agent (Nopcogen 16 L)
99.25% by weight water Referring now to FIG. 4 of the drawing, a plurality of glass coated metal wire or fiber filaments 54 are coated with one of the compositions of Examples 3 to 6. For this purpose, use can be made of an applicator 56 which is illustrated as a wiping pad which is constantly wet with the organo silicon compound treating composition. The filaments are each wet with the treating composition as they are gathered together to form a strand 60 that is wound about drum 58.

The coated strands are allowed to air dry, or, if desired, drying of the applied coating can be accelerated by exposure to elevated temperatures such as temperatures within the range of 150° to 250°F. The resulting strand is shown in cross section in FIG. 5 of the drawing, and includes the metal wire or fiber 50 which has a thin glass coating 52 on the surfaces thereof, which in turn contains a thin coating 62 of the organo silicon treating composition.

As the organo silicon compound, use can be made of any of a variety of organo silicon compounds of the type used for the treatment of glass fibers. Particularly preferred are the organo silanes of the formula:

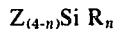

$$Z_{(4-n)} Si\ R_n$$

wherein Z is a readily hydrolyzable group such as halogen (chlorine, bromine, fluorine or iodine) or alkoxy containing 1–8 carbon atoms, such as methoxy, ethoxy, propoxy, etc., n is an integer from 1 to 3 and R is an organic group, which preferably contains less than 12 carbon atoms, such as alkyl, alkenyl, cycloalkyl or aryl groups and in which one or more of the groups can be substituted with amine groups, epoxy groups, carboxy alkyl ester groups, halogen or a variety of other substituents.

Organo silanes particularly preferred for use in the practice of the invention are those in which at least one of the R groups is substituted by at least one amino group.

In addition to the silanes described above, use can also be made of their corresponding silanols and polysiloxane polymers and copolymers.

Representative of the foregoing include the following silanes. Diethyldiethoxy silane, n-butyltriethoxy, silane, ethyltrichloro silane, isopropyldichloro silane, vinyltrichloro silane, vinyltrimethoxy silane, vinyldimethoxy silane, vinylmethyldiethoxy silane, allyltriethoxy silane, allylethyldiethoxy silane, bis-vinyldichloro silane, cyclohexyltrimethoxy silane, beta-cyclohexyltriethoxy silane, phenyltrichloro silane, benzyltrimethoxy silane, benzylethyldiethoxy silane, gamma-aminopropyltriethoxy silane, bis-(gamma-aminopropyl)dimethoxy silane, tris-(gamma-aminopropyl)methoxy silane, delta-aminobutyltriethoxy silane, gamma-aminopropylethyldimethoxy silane, p-aminophenyl trimethoxy silane, N-(beta-aminoethyl)-gamma-aminopropyltrimethoxy silane, N-[N'(beta-aminoethyl)-beta-aminoethyl]-gamma-aminopropyltrimethoxy silane, 3,4-epoxybutyltrimethoxy silane, beta-(3,4-epoxycyclohexyl)ethyltriethoxy silane, gamma-glycidoxylpropyltrimethoxy silane and gamma-methacryloxypropyltrimethoxy silane.

It will be understood that the silanols and polysiloxane polymers and copolymers of the above silanes can also be used in accordance with the practice of the invention.

Instead of the foregoing organo silicon compounds as the anchoring agent to intertie the glass coating on the metal fibers with elastomeric systems, use can also be made of a Werner complex compound in which the carboxylato group coordinated with the trivalent nuclear chromium atom preferably contains an amino group or an epoxy group. Representative of such materials are aminopropylato chromic chloride, glycine chromic complex, beta-alanine chromic complex, glyclato chromic chloride, stearato chromic chloride, etc. A typical treating composition of this type can be formulated as follows.

EXAMPLE 7

0.5% by weight aminopropylato chromic chloride
0.25% by weight fatty acid amine wetting agent (Nopcogen 16 L)
99.25% by weight water The foregoing composition can be applied to glass coated metal fibers of the type described in FIG. 3 in an amount sufficient to provide a coating constituting 1–15% by weight of the coated fiber system.

The strand 60 of glass coated metal wires or fibers individually coated with one of the foregoing organo silicon compounds or Werner complexes can be plied with other strands and twisted to form yarns, threads or cords which may be used as a reinforcement for elastomeric materials, with or without cutting to shorter lengths, without further processing. Alternatively, such yarns, threads or cords can be further processed to form woven or non-woven fabrics for subsequent combination with elastomeric materials.

In accordance with the preferred practice of the invention, after the metal fibers have been coated to provide a thin glass coating on the surfaces thereof, and preferably after they have been treated with one of the described anchoring agents, the glass coated metal fibers are formed into bundles and treated, as by impregnation, with an impregnant which serves to penetrate the glass coated metal fiber bundle and to intertie the fibers therein with an elastomeric material in the manufacture of fiber reinforced elastomeric products. This concept of the invention may be illustrated by the following examples.

EXAMPLE 8

An impregnating composition is formulated as follows:

| | |
|---|---|
| Natural rubber latex-resorcinol formaldehyde resin(38% Solids)"Lotol 5440" | 30.0% by wt. |
| Water | 70.0% by wt. |

Impregnation with the aqueous composition of Example 8 can be made by conventional means for impregnation, such as by immersion of the bundles of glass fibers in a bath of aqueous impregnating composition. Referring more specifically to FIG. 6 of the drawing, a glass coated metal fiber bundle 60 which has been prepared in the manner described in Example 1 and treated with one of the compositions of Examples 1 to 5 is advanced over a guide roller 70 for passage downwardly in the bath 72 containing the impregnating composition of Example 8. The bundle is then turned under roller 74 to effect a sharp bend which operates to open the bundle to enable fuller penetration of the aqueous impregnating composition into the bundle of glass coated metal fibers individually coated with an anchoring agent. The impregnated bundle is then raised from the bath by passage under roller 74 for passage through a roller or die 78 which operates to remove excess impregnating composition from the bundle and to work the impregnating composition into the bundle.

Thereafter, the endless bundle is advanced over a roller 80 into a drying oven 82, preferably in the form of an air drying oven maintained at a temperature above ambient temperatures, and most preferably at a temperature within the range of 150° to 350°F. to accelerate removal of the aqueous diluent and to set the impregnating material in situ in the fiber bundle. Drying will occur in a relatively short period of time, ranging from 1 to 30 minutes, depending somewhat upon the temperature of drying. Use can also be made of a dielectric treatment to coagulate the latex with little or no drying.

The resulting bundle is shown in FIG. 7 of the drawing, and includes a plurality of metal fibers 50, which are coated first with a thin glass coating 52 which in turn is coated with an anchoring agent coating 62, separated each from the other by the impregnant 84. However, it will be understood by those skilled in the art that a bundle of glass coated metal wires can be impregnated in the manner described in Example 6 without first having treated the individual filaments in the bundle with an anchoring agent. In this event, the resulting bundle includes the metal fibers 50 which are each individually coated with a thin glass coating 52, which are separated each from the other by the impregnant 84.

Suitable resorcinol aldehyde resins and combinations thereof with natural rubber latex are marketed by the U.S. Rubber Company under the tradename "Lotol 5440". For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

A wide variety of impregnating compositions may be used to impregnate the glass coated metal fiber budles in accordance with this concept of the invention. In general, the material used should be compatible with elastomeric systems to thereby serve to tie the impregnated bundle to the elastomeric material in the manufacture of fiber reinforced elastomeric products.

Representative materials include resorcinol aldehyde latices of the type employed in Example 6, elastomer latices such as those formed of natural rubber, neoprene rubber, butadiene rubber, isoprene rubber, vinylpyridine-styrene-butadiene terpolymers and resinous polymers, including, but not limited to, polyamides, polyesters, polyepoxides, acrylic polymers phenolic-aldehyde resins, melamine-aldehyde resins, urea-aldehyde resins as well as a variety of others as represented by the following examples.

EXAMPLE 9

An impregnating composition is formulated as follows:

| | |
|---|---|
| Vinyl pyridine-styrene-butadiene terpolymer (42% solids) | 35.0% by wt. |
| Water | 65.0% by wt. |

The above composition is used to impregnate a glass coated wire bundle in the manner described with reference to Example 6. In general, use should be made of sufficient impregnating composition to deposit in the fiber bundle dry solids constituting between 5–25%, and preferably 10–15% by weight, of the impregnated bundle. For this purpose, use is preferably made of impregnating compositions having a solids content within the range of 10–50% solids by weight.

The vinyl pyridine terpolymer utilized in Example 9 is a terpolymer of about 15 parts by weight vinyl pyridine, 70 parts by weight butadiene and about 15 parts by weight styrene, and is commercially available under the trademark of "Gentac" from the General Tire and Rubber Company. Use can also be made of the vinyl pyridine-butadienestyrene terpolymer impregnating composition described in U.S. Pat. No. 3,424,608 as represented by the following example.

EXAMPLE 10

| | Parts by Weight |
|---|---|
| Resorcinol formaldehyde resin | 2–10 |
| Formaldehyde(37% solution) | 1–3 |
| Concentrated ammonium hydroxide | 2–5 |
| Vinyl pyridine terpolymer (42% solids) | 15–50 |
| Neoprene rubber latex (50% solids) | 25–50 |
| Butadiene latex (60% solids) | 5–15 |
| Alkali metal hydroxide | .05–0.2 |

Water is incorporated into the foregoing materials in an amount sufficient to provide an impregnating composition having a solids content within the range of 10–50% solids by weight, and which can be used to impregnate a glass coated wire bundle in the manner described in Example 8.

Other impregnating compositions which can be used in accordance with the practice of this invention include the following:

EXAMPLE 11

| | |
|---|---|
| Neoprene latex(60% solids) | 25.0% by wt. |
| Water | 75.0% by wt. |

EXAMPLE 12

| | |
|---|---|
| Natural rubber latex (48% solids) | 28.0% by wt. |
| Water | 72.0% by wt. |

EXAMPLE 13

| | |
|---|---|
| Isobutyl rubber latex (53% solids) | 30.0% by wt. |
| Water | 70.0% by wt. |

By way of modification of the foregoing elastomer impregnating compositions, it is possible, and sometimes desirable to formulate the composition to include one or more vulcanizing agents to vulcanize or cure the latex during drying, or when dielectric treatment is used to coagulate the latex, during cure or vulcanization of the impregnated bundle in combination with an elastomeric material in the manufacture of fiber reinforced products. For this purpose, use can be made of conventional vulcanizing agents including sulfur, sulfur monochloride, selenium, tellurium, thiuram disulfides, polysulfide polymers, zinc oxide, magnesium oxide, organic peroxides as well as a variety of others. Such vulcanizing agents can generally be employed in amounts up to about 15% by weight of the latex. A typical formulation is as follows.

EXAMPLE 14

| | |
|---|---|
| Neoprene rubber latex (50% solids) | 20.0% by wt. |
| Water | 78.0% by wt. |
| Sulfur | 1.0% by wt. |
| Zinc oxide | 1.0% by wt. |

As indicated above, use can also be made of a resinous polymer in lieu of the elastomeric type impregnants described above. This concept may be illustrated by the following examples.

EXAMPLE 15

| | |
|---|---|
| Polyamide (reaction product of adipic acid and hexamethylene diamine-50% solids) | 25.0% by wt. |
| Water | 75.0% by wt. |

Application of the foregoing composition can be made in the manner described in Example 8 in an amount sufficient to deposit dry solids constituting 5–25% by weight of the fiber system.

If desired, alcohol solutions of the polyamides can be used instead of aqueous suspensoids as illustrated in Example 15. In general, polyamides suitable for use in accordance with the practice of the invention include those formed by the reaction of a polybasic acid, such as phthalic anhydride, maleic acid, adipic acid, fumaric acid or the like with a polyamine, such as the alkylene diamines. Use can also be made of polyesters, such as those formed by the reaction an acid of the type described above with a polyhydric alcohol such as glycerin, glycol and the like.

In addition, use can also be made of resinous polymers as described above. Polyepoxides particularly suitable for use in accordance with the invention include the "Poly B-D" resins from the Atlantic Richfield Company, which are hydroxyl terminated epoxide resins formed of butadiene, butadiene and styrene or butadiene and acrylonitrile.

EXAMPLE 16

| | |
|---|---|
| Polyepoxide ("Poly B-D"R15M) (viscosity of 200 p. at 30°C) | 30.0% by wt. |
| Water | 70.0% by wt. |

Application of the foregoing is made in the same manner described in Example 8.

It will be understood by those skilled in the art that a variety of polymers having one or more epoxide groups can be used in lieu of the epoxidized polybutadiene exemplified in Example 16. For example, use can be made of epoxidized polyolefins, epoxidized diene polymers and epoxy resins formed by the reaction of an epihalohydrin(e.g. eipchlorohydrin) with a polyhydric phenol such as bis(4-hydroxyphenyl)-2,2-propane, bis(hydroxyphenyl)methane, hydroquinone, resorcinol, etc. or a polyhydric alcohol such as glycol, polyethylene glycol, sorbitol, glycerol, etc.

Additional impregnating compositions which can be used to impregnate bundles of glass coated fibers can be illustrated by the following examples:

EXAMPLE 17

| | |
|---|---|
| Melamine-formaldehyde resin (MW 1433-40% solids) | 33.0% by wt. |
| Water | 67.0% by wt. |

EXAMPLE 18

| | |
|---|---|
| Polyurethane (MW 2000 formed by reaction of toluene diisocyanate with propylene glycol and end block with phenol)(40% solids) | 35.0% by wt. |
| Water | 65.0% by wt. |

It will be understood that a variety of other urethane polymers can be used in place of the polymer described above. Urethane polymers contemplated for use in the present invention are those formed of an aliphatic or aromatic polyisocyanate, such as the alkylene diisocyanates, toluene diisocyanates, polymethylene, polyphenyleneisocyanates, etc., with an organic polyhydroxylated compound. Illustrative of the polyhydroxylated compounds are organic polyols. polyether polyol or mixtures of polyols, including glycerol, trimethanol propane, butylene, glycol, polyalkylene glycols, such as polyethylene glycerol, polypropylene glycerol, polybutylene glycerol, or polyhydroxy polyesters, such as the reaction products of a polyhydric alcohol(i.e. glycol, ethylene glycol, propylene glycol) with a polycarboxylic acid, or anhydride, adipic acid, succinic acid, malonic acid, maleic acid, anhydride and the like.

It is desirable to achieve as full impregnation as possible into the bundles of glass coated metal fibers in order to more effectively separate the fibers one from the other by the impregnating materials since the solids are effective as a coating on the sized glass fibers to cushion the fibers and to protect the fibers against destruction by mutual abrasion. Thus, it is desirable to achieve as deep penetration as possible with the impregnating composition into the fiber bundle. The deeper the penetration, the more effective will be the bond between the fibers in the bundle and the elastomeric material with which the bundles of fibers are combined in the subsequent manufacture of the fiber-elastomeric product.

In the final system, the elastomeric material with which the metal fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass coated metal fibers and the elastomeric material during the fabrication of the elastomeric material.

More complete protection of the individual glass coated metal fibers and a fuller coordination with the elastomeric material in the continuous phase can be achieved when the impregnating compositions of Examples 8 to 18 are modified for treatment of the individual glass coated metal fibers prior to their being formed into bundles as described with reference to Examples 3 to 7. For this purpose, the impregnating compositions of Examples 8 to 18 should be formulated to include one or more of the anchoring agents described above as represented by the organo silicon compounds or the Werner complexes.

This concept of the invention may be illustrated by the following examples:

EXAMPLE 19

| | |
|---|---|
| Natural rubber latex-resorcinol formaldehyde resin (38% solids)"Lotol 5440" | 20.0% by wt. |
| Gamma-aminopropyltriethoxy silane | 1.0% by wt. |
| Water | 79.0% by wt. |

EXAMPLE 20

| | Parts by Weight |
|---|---|
| Resorcinol formaldehyde resin | 2–10 |
| Formaldehyde (37% solution) | 1–3 |
| Concentrated ammonium hydroxide | 2–5 |
| Vinyl pyridine terpolymer (42% solids) | 15–50 |
| Neoprene rubber latex (50% solids) | 25–50 |
| Butadiene latex (60% solids) | 5–15 |
| Alkali metal hydroxide | .05–0.2 |
| bis-(gamma-aminopropyl) dimethoxy silane | .1–3 |

Water is incorporated into the foregoing materials in an amount sufficient to provide an impregnating composition having a solids content within the range of 5–25% solids by weight.

EXAMPLE 21

| | |
|---|---|
| Vinyl pyridine-styrene-butadiene terpolymer (42% solids) | 25.0% by wt. |
| Gamma-glycidoxypropyl-triethoxy silane | 1.0% by wt. |
| Benzyl trimethylammonium hydroxide | 2.0% by wt. |
| Water | 72.0% by wt. |

EXAMPLE 22

| | |
|---|---|
| Neoprene latex(60% solids) | 20.0% by wt. |
| Gamma-aminopropylato chromic chloride | 1.0% by wt. |
| Water | 79.0% by wt. |

EXAMPLE 23

| | |
|---|---|
| Polyamide (reaction product of adipic acid and hexamethylene diamine-50% solids) | 20.0% by wt. |
| Gamma-aminopropyltriethoxy silane | 1.0% by wt. |
| Water | 79.0% by wt. |

The foregoing compositions generally contain between 0.1–3% by weight of the anchoring agent, and can be applied to coat the individual glass coated metal fibers in accordance with the method described with reference to Examples 3 to 6.

As illustrated by way of Examples 20 and 21, it is sometimes desirable to employ in the more alkaline impregnating compositions employed in the practice of this invention a quaternary tetra-organo ammonium hydroxide to stabilize the pH of the system in the presence of an acidic anchoring agent, such as the organo silanes or the Werner complexes described. For this purpose, use can be mae of tetraalkyl or tetraalkanol ammonium hydroxides as represented by tetramethyl ammonium hydroxide, tetraethyl ammonium hydroxide, tetraethanol ammonium hydroxide, etc. Also contemplated are the benzyl trialkylammonium hydroxides.

It will be understood by those skilled in the art that the treating compositions as illustrated by Examples 19–23 can be used as impregnating compositions, preferably with a lesser dilution in order to provide the desired solids content within the fiber bundle. It will also be understood that it is possible, and sometimes desirable, to first individually coat the glass coated metal fibers with one of the compositions of Examples 19–23, and then impregnate a bundle formed of the individual coated fibers with one of the impregnant compositions as described in Examples 8–18.

In fabricating the combinations of the glass coated metal fibers treated in accordance with the practice of the present invention with elastomeric materials, the glass coated metal fibers or bundles of glass coated metal fibers are admixed with elastomeric material or otherwise laid down in the desired arrangement for combination with the elastomeric material as in the manufacture of rubber tires reinforced with cords of fibes. The combination of glass coated metal fiber and elastomeric material is processed in a conventional manner by molding or cure under heat and compression, or by vulcanization for advancement of the elastomeric material to a cured or vulcanizable stage while in combination with the treated glass coated metal fiber whereby the glass coated metal fibers or bundles of glass coated metal fibers become strongly integrated with the elastomeric material in the fiber reinforced elastomeric product.

It will be apparent from the foregoing that I have provided a new and improved method for use in the treatment of metal fibers to enhance their integration with elastomeric material in the manufacture of fiber reinforced elastomeric products. It will be understood that the invention exists not only with respect to the method for treating the metal fibers, but also with respect to the treated or impregnated glass coated metal fiber products produced in accordance with the invention.

It will be understood that various changes and modifications can be made in the details of formulation and methods of application or use without departing from the spirit of the invention, especially as defined in the following claims.

I claim:

1. Fibers for use in the reinforcement of elastomeric materials comprising metal fibers having a smooth continuous glass coating on the surfaces thereof, said glass coating containing a thin coating of an anchoring agent selected from the group consisting of an organo silicon compound and a Werner complex, and an elastomer compatible polymeric material selected from the group consisting of a resorcinol-aldehyde resin and rubber, a vinyl pyridine-butadiene-styrene terpolymer, elastomers and resinous polymers.

2. Fibers as defined in claim 1 wherein the metal fibers have a thickness sufficient to retain their fibrous characteristics.

3. Fibers as defined in claim 1 wherein the fibers have a thickness within the range of 0.00015 to 0.00075 inch.

4. Fibers as defined in claim 1 wherein the glass coating has a thickness within the range of 0.00001 to 0.00020 inch.

5. Fibers as defined in claim 1 wherein the metal fibers have a thickness within the range of 0.00030 to 0.00040 inch.

6. Fibers as defined in claim 1 wherein the anchoring agent is a Werner complex in which the carboxylato group coordinated with the trivalent chromium atom contains an amino group or an epoxy group. fibers.

7. Fibers as defined in claim 1 wherein the thin coating constitutes between 1 and 12% by weight of the fiber system.

8. Fibers as defined in claim 1 wherein the thin coating of the anchoring agent contains an organo silicon compound selected from the group consisting of an organo silane of the formula:

$$Z_{(4-n)} Si R_n$$

wherein Z is a readily hydrolyzable group, $n$ is an integer from 1 to 3 and R is an organic group, their corresponding silanols and siloxane polymers and copolymers.

9. Fibers as defined in claim 8 wherein R is hydrocarbon groups containing up to 12 carbon atoms and at least one of the R groups is substituted with a group selected from the group consisting of an amino group, an epoxy group, a carboxyalkyl ester group and a halogen group.

10. A fiber bundle for use in the reinforcement of elastomeric materials comprising a plurality of metal fibers, each of said fibers having a continuous coating of glass on the surfaces thereof, and an impregnant in the bundle comprising an elastomer compatible polymeric material selected from the group consisting of a blend of a resorcinol-aldehyde resin and rubber, a vinyl pyridine-butadiene-styrene terpolymer, elastomers and resinous polymers, said impregnant completely filling the interstices between the fibers to define a unitary bundle.

11. A fiber bundle as defined in claim 10 wherein the impregnant constitutes 5-25% by weight of the impregnated bundle.

12. A fiber bundle as defined in claim 10 wherein the metal fibers have a thickness sufficient to retain their fibrous characteristics.

13. A fiber bundle as defined in claim 10 wherein the fibers have a thickness within the range of 0.00015 to 0.00075 inch.

14. A fiber bundle as defined in claim 10 wherein the glass coating has a thickness within the range of 0.00001 to 0.00020 inch.

15. A fiber bundle as defined in claim 10 wherein the metal fibers have a thickness within the range of 0.00030 to 0.00040 inch.

16. A fiber bundle as defined in claim 10 wherein the individual glass coated metal fibers contain a thin coating comprising a material selected from the group consisting of an anchoring agent and a mixture of an anchoring agent and an elastomer compatible polymeric material.

17. A fiber bundle as defined in claim 10 wherein the impregnant also includes an anchoring agent.

18. A fiber bundle as defined in claim 17 wherein the anchoring agent is selected from the group consisting of an organo silicon compound and a Werner complex.

19. In a fiber reinforced elastomeric product in which an elastomeric material constitutes the continuous phase in which the fibers are distributed, the improvement comprising fibers formed of a metal coated with a continuous glass coating to form a glass coated metal fiber, the glass coated metal wires being coated with a material selected from the group consisting of an anchoring agent selected from the group consisting of an organo silicon compound and a Werner complex, an elastomer compatible polymeric material selected from the group consisting of a blend of a resorcinol-aldehyde resin and rubber, a vinyl pyridine butadiene-styrene terpolymer, elastomers and resinous polymers, and mixtures thereof.

20. A fiber reinforced elastomeric product as defined in claim 19 wherein the metal fibers have a thickness sufficient to retain their fibrous characteristics.

21. A fiber reinforced elastomeric product as defined in claim 19 wherein the fibers have a thickness within the range of 0.00015 to 0.00075 inch.

22. A fiber reinforced elastomeric product as defined in claim 19 wherein the glass coated fibers are distributed in the elastomer in the form of fibers individually coated with said material.

23. A fiber reinforced elastomeric product as defined in claim 19 wherein the glass coated fibers are distributed in the elastomer in the form of a bundle impregnated with an impregnant selected from the group consisting of the elastomer compatible polymeric material and a mixture of the elastomer compatible polymeric material and an anchoring agent.

24. A fiber reinforced elastomeric product as defined in claim 23 wherein the individual glass coated fibers forming the bundle have a thin coating of the anchoring agent on the surfaces thereof.

25. In the method for treating metal fibers to enhance the bonding relationship of metal fibers with elastomeric materials in the manufacture of metal fiber reinforced elastomeric products in which an elastomer constitutes the continuous phase in which the metal fibers are distributed, the improvement comprising coating the metal fibers with a glass material to form a continuous glass coating thereon, passing the coated fibers through a die to smooth the glass coating formed, and coating the resulting glass coated metal fibers with a material selected from the group consisting of an anchoring agent, an elastomer compatible polymeric material selected from the group consisting of a blend of a resorcinol-aldehyde resin and rubber, a vinyl pyridine butadiene-styrene terpolymer, elastomers and resinous polymers, and mixtures thereof.

26. A method as defined in claim 25 wherein the metal fibers are passed through a molten bath of glass and then passed through the die to smooth the glass coating thus formed.

27. A method as defined in claim 25 wherein the metal fibers have a thickness sufficient to retain their fibrous characteristics.

28. A method as defined in claim 25 wherein the fibers have a thickness within the range of 0.00015 to 0.00075 inch.

29. A method as defined in claim 25 wherein the glass coated metal fibers are individually coated.

30. A method as defined in claim 25 wherein the glass coated metal fibers are formed into a bundle and the bundle is impregnated to coat the fibers.

31. A method as defined in claim 25 wherein the metal fibers are contacted with a glass material while at an elevated temperature to deposit glass on the surfaces thereof, and then passed through a die to smooth the glass coating thus formed.

32. A method as defined in claim 31 wherein the glass material is selected from the group consisting of glass frit and molten glass.

33. A method as defined in claim 31 wherein the metal is at a temperature within the range of 1200° to 1900°F. when contacted with the glass material.

34. A method as defined in claim 30 wherein the bundle is impregnated with an elastomer compatible polymeric material.

35. A method as defined in claim 34 which includes the step of individually coating the glass coated metal fibers with an anchoring agent prior to formation into bundles.

* * * * *